(12) United States Patent
Basham et al.

(10) Patent No.: US 10,360,189 B2
(45) Date of Patent: Jul. 23, 2019

(54) DATA OBJECT STORAGE ACROSS MULTIPLE STORAGE NODES

(71) Applicant: International Business Machines Corporation, Armonk, NY (US)

(72) Inventors: Robert Basham, Aloha, OR (US); Michael Factor, Haifa (IL); Robert Haas, Adliswil (CH); Simon Lorenz, Biebertal (DE); William W. Owen, Tucson, AZ (US); Slavisa Sarafijanovic, Adliswil (CH); Harald Seipp, Mainz (DE); Thomas D. Weigold, Thalwil (CH)

(73) Assignee: International Business Machines Corporation, Armonk, NY (US)

(*) Notice: Subject to any disclaimer, the term of this patent is extended or adjusted under 35 U.S.C. 154(b) by 226 days.

(21) Appl. No.: 15/605,646

(22) Filed: May 25, 2017

(65) Prior Publication Data
US 2018/0341665 A1 Nov. 29, 2018

(51) Int. Cl.
*G06F 17/00* (2019.01)
*G06F 16/21* (2019.01)
*G06F 16/22* (2019.01)

(52) U.S. Cl.
CPC .......... *G06F 16/211* (2019.01); *G06F 16/22* (2019.01)

(58) Field of Classification Search
CPC .......... G06F 15/17331; G06F 16/178; G06F 9/5088; G06F 16/134; G06F 16/1744; G06F 16/1752

(Continued)

(56) References Cited

U.S. PATENT DOCUMENTS 9,268,808 B2 2/2016 Muthukkaruppan et al.
9,378,067 B1 6/2016 Agarwala et al.
(Continued)

FOREIGN PATENT DOCUMENTS

EP 2049982 B1 4/2016

OTHER PUBLICATIONS

Jiangtao Li, et al., "Data Placement for Tertiary Storage," Apr. 2014, pp. 1-15.

(Continued)

*Primary Examiner* — Truong V Vo
(74) *Attorney, Agent, or Firm* — Daniel P. Morris, Esq.; Hoffmann & Baron, LLP

(57) ABSTRACT

An object-based data storage system includes a memory and a processor for executing machine executable instructions configured for implementing logical containers for data objects each having a global identifier. The containers are configured for storing metadata including a first parameterization value descriptive of a number of storage nodes and a second parameterization value descriptive of a classification of the data objects. The machine executable instructions are further configured for implementing a first object storage ring for addressing storage locations across the multiple storage nodes using a surjective function. Execution of the instructions causes the processor to: instantiate the first object storage ring, receive the global identifier and the metadata by the first object storage ring, and generate a storage address by the first object storage ring for the data object using the global identifier, the first parameterization value and the second parameterization value as input to the surjective function.

20 Claims, 7 Drawing Sheets

(58) Field of Classification Search
USPC .......................................................... 707/704
See application file for complete search history.

(56) References Cited

U.S. PATENT DOCUMENTS 9,396,202 B1     7/2016    Drobychev et al.
9,462,056 B1    10/2016    Protopopov et al.

OTHER PUBLICATIONS

Zong Ling, "Tips for Tivoli Storage Manager Performance Tuning and Troubleshooting," Tivoli Software, IBM Corporation, 2007, pp. 1-47.

Feng Wang, et al., "OBFS: A File System for Object-Based Storage Devices," 21st IEEE/12th NASA Goddard Conference on Mass Storage Systems and Technologies (MSST2004), Apr. 2004, pp. 1-18.

DATA OBJECT STORAGE ACROSS MULTIPLE STORAGE NODES

BACKGROUND

In object-based storage data objects are managed in an object-based fashion. An implementation of an object-based storage may contain different containers which are used to logically hold and arrange the data objects. Typically the data objects are stored in a collection of data nodes. Each container and data object may have a global identifier which is used to identify the uniquely identify a data object. A hash function may be used to generate a storage location for the data objects. Such a system works well with low latency storage devices such as disk drives.

SUMMARY

In one aspect, the invention relates to an object-based data storage system for storing data objects across multiple storage nodes. An object-based data storage system as used herein encompasses a device or system for storing data that stores the data as objects. A data object will include the data itself and typically also metadata has a globally unique identifier. In different examples object-based data storage systems may be implemented differently. Object-based storage may be implemented using a storage device, as a complete system, and also at an interface level. In some examples such as the system or interface level normal block storage devices may be integrated into the object-based data storage system. A storage node as used herein may encompass a data storage device or a sub-system comprised of multiple storage devices for storing data.

The object-based data storage system comprises a memory for storing machine-executable instructions. The machine-executable instructions are configured for implementing logical containers for the data objects. Each of the data objects has a global identifier. The object-based data storage system has the multiple storage nodes. The number of the multiple storage nodes is a numbering or counting of the multiple storage nodes. The containers and/or the data objects are configured for storing metadata. The metadata comprises a first parameterization value descriptive of across how many of the multiple storage nodes the data objects of a container or of another logical grouping of data objects are stored. The metadata comprises a second parameterization value descriptive of a classification of each of the data objects. The second parameter may be considered to be descriptive of the selection of nodes from the multiple storage nodes for storing the data objects that have a specific value of the second parameter. For example the second parameterization value enables particular data objects to be grouped together and stored together in a grouping in the multiple storage nodes. The values of the first and the second parameterization values together determine a subset of the multiple storage nodes. All objects with the same values of the first and second parameterization values are stored to the same determined subset of the multiple storage nodes.

The machine-executable instructions are further configured for implementing at least a first object storage ring for addressing storage locations across the multiple storage nodes using a surjective function. A surjective function as used herein is also considered to be an onto function. The surjective function is used for generating addresses for storing data in the multiple storage nodes. In some examples the surjective function may be considered to be a hash function. Many hash functions are bijective or may be considered to be nearly or essentially bijective functions. However, for the surjective function to effectively generate storage locations it is not necessary that the function be strictly bijective.

The object-based data storage system further comprises a processor for executing the machine-executable instructions. Execution of the machine-executable instructions causes the processor to instantiate the at least first object storage ring. Execution of the machine-executable instructions further causes the processor to receive the global identifier and the metadata via the at least first object storage ring for a data object selected from the data objects. Execution of the machine-executable instructions further causes the processor to generate a storage address by the at least first object storage ring for the data object by calculating a combination of the global identifier, the first parameterization value, and the second parameterization value using the surjective function.

In another aspect, the invention further relates to a method of storing data objects across multiple storage nodes using the object-based data storage system. The object-based data storage system is configured for implementing logical containers for the data objects each having a global identifier. The containers and/or the data objects are configured for storing metadata. The metadata comprises a first parameterization value descriptive of across how many of the multiple storage nodes the data objects of a container or of another logical grouping of data objects are stored. The metadata comprises a second parameterization value descriptive of a classification of the data objects. The machine-executable instructions are further configured for implementing at least a first object storage ring for addressing storage locations across multiple storage nodes using a surjective function.

The method comprises instantiating the at least first object storage ring. The method further comprises receiving the global identifier and the metadata by the at least first object storage ring for a data object selected from the data objects. The method further comprises generating a storage address by the at least first object storage ring for the data object using the global identifier, the first parameterization value, and the second parameterization value as input to the surjective function.

Embodiments of the present invention and/or examples described herein can be freely combined with each other if they are not mutually exclusive.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
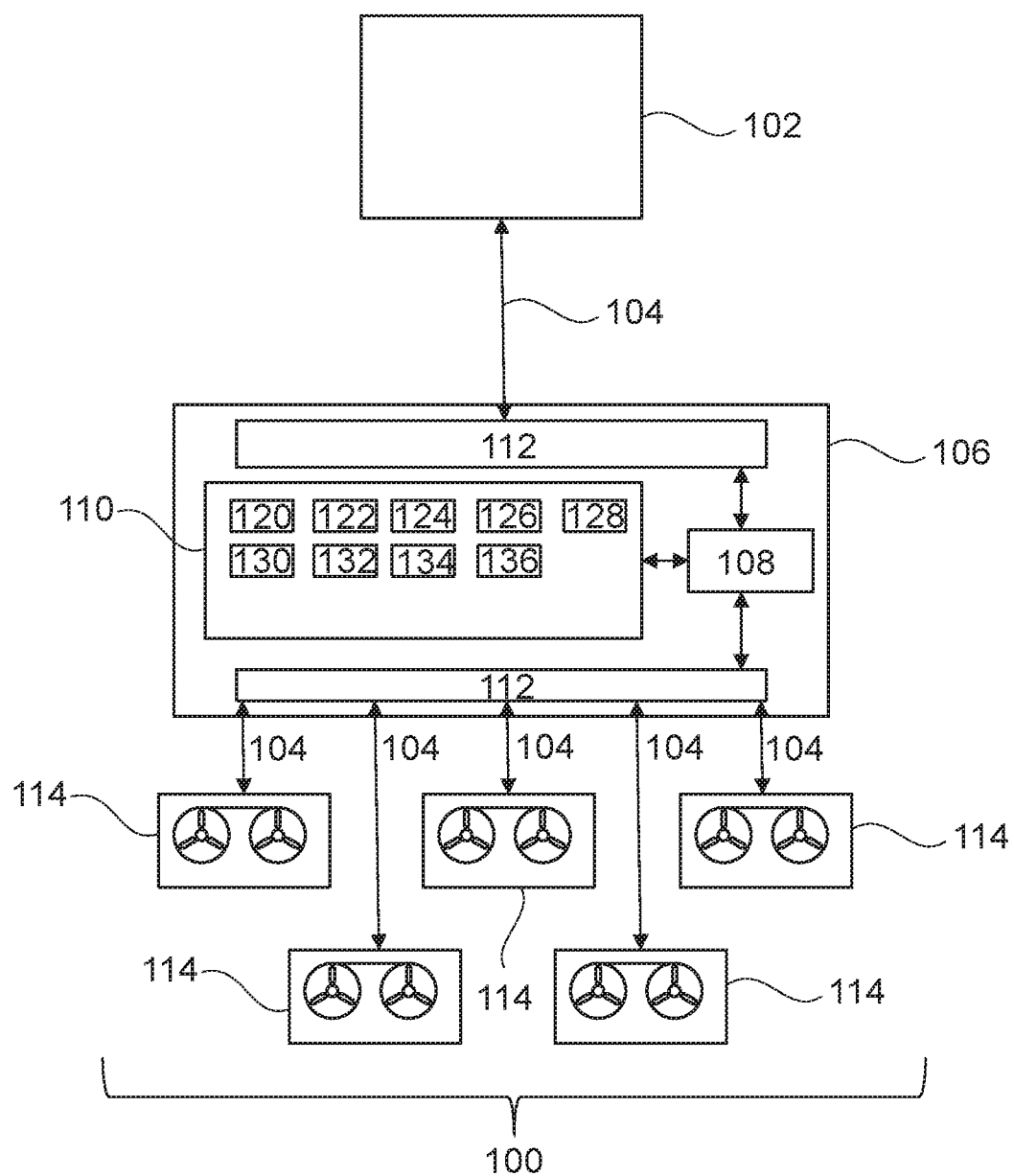
FIG. 1 depicts an implementation of an object-based data storage system.

Examples may have the benefit that the use of the first parameterization value and the second parameterization value with the global identifier causes the data objects with the same parameterization value and the second parameterization value to be grouped together. This may be beneficial for object-based data storage systems that incorporate low bandwidth or slow storage devices for implementing the multiple storage nodes. For example, this may enable such things as low latency object storage rings implemented by tapes or other slow storage systems.

In another example, the global identifier of the data objects may be stored in a directory or a list managed by the object-based data storage system.

In another example, the second parameterization value can be considered to be equivalent to a selection of a classification for a particular data object. The first parameterization value determines the number of nodes to use when storing. The second parameterization value determines a selection of the nodes. The second parameterization value may have the effect of determining which containers are assigned to particular nodes. So this could also be understood as equivalent to a selection of a classification for a container.

In another example, the at least first object storage ring can be one or more high latency object storage rings. A ring as used herein encompasses an implementation of a mapping from the object name space which may include object identifiers to ring partitions that are then further mapped to nodes and storage devices. The ring may function as a logical interface to the physical devices which are used to store the data objects in the multiple storage nodes.

In another example, the surjective function is a hash function. This example may be beneficial because it may provide for an efficient means of grouping data objects with identical first parameterization values and second parameterization values onto the same storage nodes.

In another example, the data storage system further comprises the multiple storage nodes. At least a portion of the multiple storage nodes are configured for accessing high latency storage devices. This example may be beneficial because normally high latency storage devices are unsuitable for object-based data storage systems because of the high access time. For example if a high latency storage device such as tape drives were used a normal object-based data storage system would spread the data in various storage locations across the tapes. In order to store or access the data the tapes would need to seek and recover data from multiple tapes in multiple locations. This may have a prohibitively large time to access these storage locations. The use of the first parameterization value and second parameterization value enables the grouping of data for the data objects to be stored efficiently together.

In another example, the high latency storage device may comprise any one of the following: a magnetic tape drive, a floppy disk drive, a compact disc data drive, a digital video disc data drive, a Blu-ray data drive, an optical disc drive, a magneto-optical drive, and combinations thereof.

In another example, each of the multiple storage nodes are configured for accessing a subset of the high latency storage devices.

In another example, each of the multiple storage nodes is a cluster of nodes configured for accessing the same combination of the high latency storage devices.

In another example, the second parameterization value is an identifier of a container of the object-based data storage system, or the second parameterization value is assigned the same value for a subset of objects from a container. When the second parameterization value is assigned the same value for an entire container all objects in the container are put on the same subset of ring nodes. When the second parameterization value is assigned the same value for a subset of objects from a container, the subset of objects may be stored within a subset of the storage ring nodes then, and a different subset of the objects may also be stored to a different subset of the ring nodes.

In another example, the container is configured for storing its objects to a selection of the at least a first object storage ring. In this example as the topology of the multiple storage nodes is changed additions or subtractions to the topology can be represented by adding a new storage ring. For example if the object-based data storage system has more storage nodes added to it the original containers may use the previously used storage ring. After the new storage rings have been added there may be a new storage ring and new containers then point to this new storage ring.

In another example, execution of the machine-executable instructions further causes the processor to receive a command to add an additional storage node to the multiple storage nodes. Execution of the machine-executable instructions further causes the processor to instantiate a new object storage ring in response to the command to add an additional storage node. Execution of the machine-executable instructions further cause the processor to store a selection of the new storage container in the metadata of a newly added container so that data objects of the newly added container are stored to the new object storage ring. Containers that are created and added after the new object storage ring has instantiated use the new object storage ring for storing their data objects. This example may provide an efficient way to add additional storage nodes to the object-based data storage system.

In another example, the at least first object storage ring is further configured to retrieve a data object from the multiple storage nodes using the storage address.

In another example, the at least first object storage ring is further configured to store a data object from the multiple storage nodes using the storage address.

In another example, the global identifier comprises an account identifier, a container identifier, and an object identifier. The container identifier may be used to identify a logical group of data objects. The object identifier obviously is used to identify a particular object and the account identifier may be used to identify a particular user or permissions group which has access to the data or a group of data.

In another example, the storage address is calculated from a concatenation of the account identifier, the container identifier, the second parameterization value, and the modulus of a hash of the object identifier and the first parameterization value. This example may be beneficial because it may provide for an efficient means of grouping containers such that they are stored in the same or very close locations within particular storage nodes.

In another embodiment, the object-based data storage system is configured for generating the second parameterization value by applying a mapping to the container identifier and an incremental value. The use of the incremental value may provide for a means for systematically placing different subsets of a container to different subsets of the storage nodes.

In other example, the object-based data storage system is configured for generating the incremental value using a time value. For example, certain periods or time windows may be assigned to a particular incremental value. This may be beneficial because it may provide for means of dynamically partitioning a container into the container subsets, yet being able to efficiently store the first and the second parameterization values only once per time range.

In another example, the object-based data storage system is configured for generating the first parameterization value using a value less than or equal to a number of the multiple storage nodes.

In another example, the object-based data storage system further comprises a low-latency object storage ring. The low-latency storage ring comprises a first logical arrangement for multiple storage containers containing objects. The at least first object storage ring comprises a second logical arrangement for the multiple storage containers containing the objects. The object-based data storage system comprises a mapping between the first logical arrangement and the second logical arrangement to offload infrequently accessed data from the low-latency object storage ring to the high-latency object storage ring.

In another example, the at least first object storage ring in the above example is a high-latency storage ring.

In another example, the object-based data storage system comprises a storage buffer. Execution of the machine-executable instructions causes the processor to add one or more new data objects to the object-based data storage system by instantiating containers for the one or more new data objects. Execution of the machine-executable instructions further causes the processor to add one or more new data objects to the object-based data storage system by further storing the one or more new data objects in the storage buffer. Execution of the machine-executable instructions further cause the processor to add one or more new data objects to the object-based data storage system by further copying the one or more new data objects in the storage buffer stored within a predetermined time interval to one of the at least first object storage ring. Each of the one or more new data object is assigned an identical second parameterization value.

This example may be beneficial because the storage buffer may for example be a low-latency storage device such as a disc drive or RAM memory. The multiple storage nodes may for instance be high-latency storage devices such as tape drives. Using the buffer may then provide in a way to efficiently temporarily store the data on a low-latency system and then periodically store it to the low-latency storage nodes. The use of the storage buffer may also be an efficient way of grouping together containers using the second parameterization value. For example all of the data stored in the storage buffer which is then subsequently written to tape may be assigned the same second parameterization value.

In another example, execution of the machine-executable instructions further cause the processor to temporarily move at least a portion of the storage buffer to the multiple storage nodes if the storage buffer contains more than a predetermined amount of data. This example may be beneficial because it may prevent the storage buffer from overflowing.

Execution of the machine-executable instructions further cause the processor to copy all data objects with a chosen second parameterization value to the storage buffer. Data objects with the chosen second parameterization value are erased from the multiple storage nodes as they are copied. Execution of the machine-executable instructions further causes the processor to move the data objects with the chosen second parameterization value in the storage buffer to one of the at least first object storage ring.

In another example, the data objects with the chosen second parameterization value are each assigned a new second parameterization value before moving. This example may be beneficial because it may help to reclassify and restore the data objects more efficiently.

In another example, the at least first object storage ring is configured for generating multiple storage addresses with multiple surjective functions to redundantly store the data objects. Each of the multiple storage addresses is generated with the multiple surjective functions using the combination of the global identifier, the first parameterization value, and the second parameterization value. This example may be beneficial because it may be an efficient way of storing data on the multiple storage nodes multiple times to ensure high data availability and durability in case of node and device failures.

In another example, the object-based data storage comprises storage objects. The object-based data storage system is configured for storing the metadata in the storage objects.

FIG. 1 shows an example of a physical implementation of an object-based data storage system 100. Other examples shown herein represent logical implementations. In FIG. 1 there can be seen a client 102 computer system connecting to the object-based data storage system 100 via a network connection 104. The network connection 104 connects to one or more computer systems 106 that are used to form the object-based data storage system 100. The one or more computer systems 106 contain one or more processors 108 that are connected to network interfaces 112 and a memory 110. The memory 110 may be any memory that enables the processor 108 to retrieve and store data. It can also be seen there are a number of storage nodes 114 also connected via network connections 104 and from network connections 104 with the network interface 112.

The computer memory 110 is shown as containing machine-executable instructions 120 which are used for implementing the object-based data storage system 100. The machine-executable instructions 120 contain instructions for execution by the one or more processors 108. The memory 110 is further shown as containing an instance of one or more first object storage rings 122 that has been instantiated by executing the machine-executable instructions 120. The memory 110 is further shown as containing an instance of one or more storage objects with one or more logical containers. The instantiation 124 is a logical instance and contains such things as metadata. The actual storage for the storage objects 124 is distributed in the storage nodes 114.

The memory 110 is further shown as containing a library of global identifiers 126 that may serve as a database for the data objects stored in the storage nodes 114. The memory 110 is further shown as containing a surjective function 128 that is used for generating addresses for storing and retrieving data from the storage nodes 114. The surjective function 128 in many implementations may be a hash function. The memory 110 is further shown as containing a global identifier 130, a first parameterization value 132 and a second parameterization value 134 that have been retrieved for a particular object from its container metadata. The global identifier 130, the first parameterization value 132 and the second parameterization value 134 are input into the surjective function 128 to generate a storage address 136. The storage address 136 may then be used to access a storage location on one of the storage nodes 114. The storage address 136 can for example be either used to store data or retrieve data from the storage nodes 114.

Figure 2:
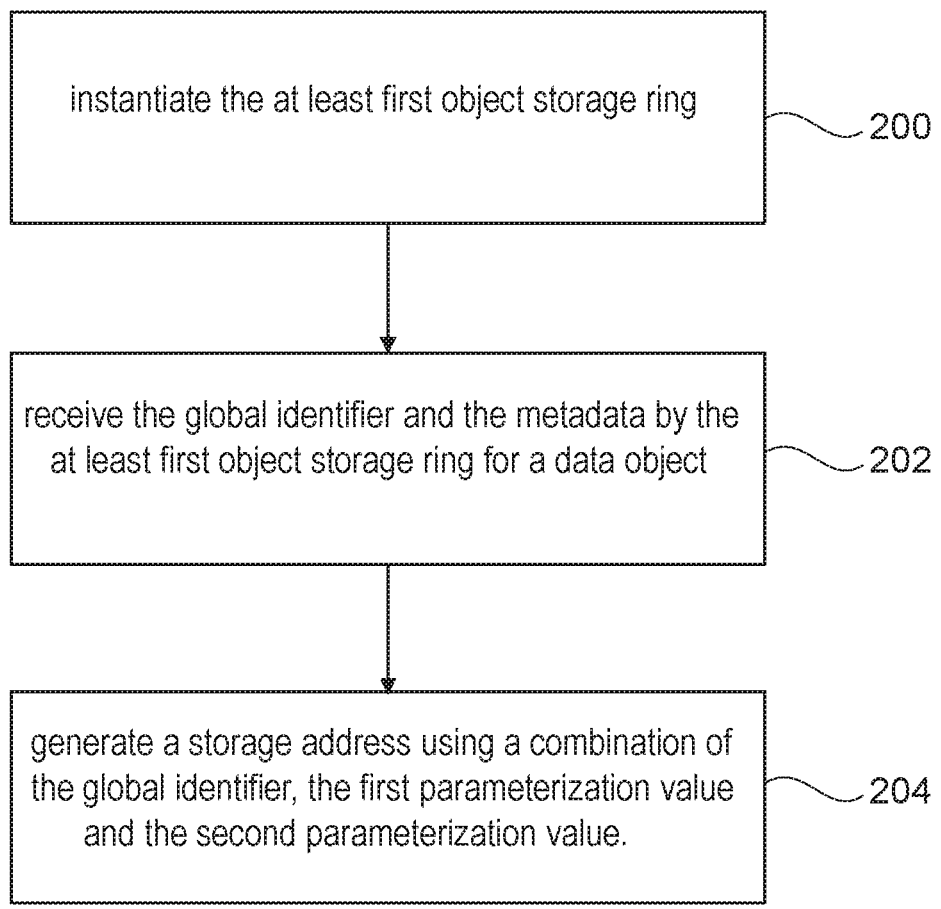
FIG. 2 shows a block diagram which illustrates a method of operating the object-based data storage system of FIG. 1.

FIG. 2 shows a flow diagram which illustrates a method of using the object-based data storage system 100 illustrated in FIG. 1. First in step 200 the machine-executable instructions 120 are used to instantiate the at least first object storage ring 122. Next in step 202 execution of the instructions 120 cause the processor to receive the global identifier 130 and the metadata which contains the first parameterization value 132 and the second parameterization value 134. This global identifier and metadata is for the at least one object storage ring and for a data object selected from its container metadata. Finally in step 204 the storage address 136 is generated using the surjective function 128 to process a combination of the global identifier 130, the first parameterization value 132, and a second parameterization value 134.

Examples may address performance and efficiency issues for storing, managing and accessing data in a distributed object storage system wherein the used storage media is a high latency media (HLM) such as tape.

Object storage solutions may work well for random access to low latency media (LLM) such as hard disk drives (HDD) and solid state drives (SSD). Robustness and scalability of such solutions may be based on use of hash-based randomized data distribution from data access nodes to data storage nodes.

A problem with such simple randomized-data-distribution based solutions when applied with HLM storage is that the resulting performance and efficiency of data access is for many practical use cases far suboptimal compared to actual performance that can be delivered by the used tape technology.

The problem stems from the fact that randomized access to tapes and data within tapes implies unnecessarily large number of tape mounts and seeks, and therefore a small percentage of drive time used for actual data reads. Consequently, the effective read-out bandwidth delivered by the drives becomes much smaller than the nominal drives speed. Also the read request to many different tapes compete for drives and get queued and delayed much more than imposed by tape technology itself. The number of expensive tape drives required to satisfy even small or moderate data read demands would be unnecessarily high thus offsetting the tape media cost advantage.

A typical and representative object storage use case in which this problem occurs is archiving a container of objects that may need to be accessed together in the future. Examples are archiving inactive project data, scientific observation or experiment data, measurement data, or surveillance data, which might need to be accessed or processed in the future.

For such use cases, if a simple randomized (state of the art) data distribution is used, the objects of the container are likely stored across all of the storage nodes. This implies at least one tape per storage node (or a cluster of nodes that share tape resources) to store the container objects to tape, whether they are first cached on disk or not. If multiple such containers that are stored independently are accessed for read in parallel, from one or different users, then because those containers are likely to be on different tapes serving each container is likely to require a different tape mount on each storage node involved, which is very inefficient except for use cases with very large objects.

As a numerical example, consider the described use case with N=100 nodes and M=1000 objects per container, with each object V=100 MB in size, and parallel access from one or multiple users to K=100 independently stored containers. And assume use of a recent LTO tape technology, e.g. IBM's LTO7[16], with drive write and read speed of B=300 MB/s, load and mount time Tm=15.3 s, seek time Ts=60 s, average rewind and unmount time Tu=77 s, and each node equipped with D=2 tape drives and T=500 tapes. If a simple randomized (state of the art) data distribution is used, and assuming the favorable case where the data of a container stored by each involved node is stored sequentially on one of the tapes accessible through that node, reading the entire K containers takes approximately: Tr=[(Tm+Ts+Tu)+(M/N)*(V/B)]*(K/D)=[152.3+10*0.33]*50=[152.3+3.3]*50=155.6*50=7780 seconds (>2 h), and involves approximately 10000 mount operations. The exact numbers could be somewhat smaller due to a small but non-zero probability that an involved tape contains data from more than one involved container, if that is used to avoid some unnecessary mounts. But in this example and in many practical scenarios that probability is relatively small and the above result can be considered as a good approximation. While in this example all the drives are used all the time, most of the drive time is spend in mounts, seeks and unmounts (152.3 seconds per container) and only a small fraction of drive time is actual data reads (3.3 seconds per container), i.e. drive utilization for reading data is only about 2%. The hardware cost of reading the data is Cd=N*D*TR/3600=432 drive-hours.

If for the considered use case a container was for example stored through only one node and on one tape, reading data from all K containers would approximately take only Tr=(Tm+Ts+Tu)+(M*(V/B)=152.3+333.3=486 seconds (<10 min) i.e. much faster compared to randomized data placement. Moreover, only half of the tape drives would be used, and only 100 mount operations performed. The tape drives in use would be used much more efficiently and would spend 68% time reading data and 32% time for mounts, seeks, and unmounts. The hardware cost of reading the data is Cd=N*1*Tr/3600=13.5 drive-hours, about 30 times less than using the original data placement.

The above exemplary alternative data placement illustrates the inefficiency of the randomized disk-friendly data placement when used with tape and suggests a solution that might be suitable for the considered specific use case. However, other data placements may be required for efficient data access based on other aspects of an object storage use case: average object size, container size, expected time to retrieve a container, data storing patterns. Time to retrieve container data is often a mandatory aspect of storage product performance characteristics or a storage customer service level agreement, and may require different data placements depending on the container size. Also, slowly filling containers may be more difficult to collocate on tapes if written to tape part by part due to, for example, caching limitations, compared to containers that are stored at once.

Also, simple hash-based randomized data placement used with tape makes it very difficult in a multi-tenant environment to limit workload impacts between tenants or users. If a tenant suddenly requests a large amount of data, since that data is spread across all resources it will impact a broad number of other tenants. This makes it much more difficult to ensure reasonable service level agreements in a multi-tenant environment. This invention limits that impact using data collocation and anti-collocation techniques that will be described.

Also, since individual tape access by one tenant or user is typically infrequent or periodic, building a large scale system in which the expensive tape drives, and also the accessor or storage nodes, are shared to serve many users allows achieving good utilization of the tape drives and therefore a favorable overall storage cost.

Examples may provide a solution for large scale object storage on high latency media such as tape that is practical, cost effective, and data-access efficient across a range of typical archiving use cases.

Another problem with a simple hash-based randomized data placement is related to data rebalancing. In many use cases storage system capacity needs to be increased due to growth of number of users and amount of data to store. When adding nodes and storage to an existing system, the hash based state of the art solutions targeted for disk storage move some data from existing nodes to new nodes, and do that in a way that typically moves some of the objects from most of the previously stored containers. For many use cases this causes unnecessary tape mounts and problems similar as in previously described parallel access to data from multiple containers.

Examples may have the advantage of providing for efficient HLM data rebalancing.

Tape technology is such that the read units i.e. the tape drives are separated from the storage units i.e. the tapes, and for cost reasons typically a number of tape drives is shared for serving reads from much larger number of tapes. For reading an object stored on tape, the tape containing the object data needs first to be mounted to a tape drive if it is not already mounted. Then the tape may need to be positioned to the location of the stored object data, typically referred to as a seek operation. The object data can then be read from the tape. Additionally, when all reads on that tape are completed a rewind of the tape back to beginning of the tape position and the tape unmount are required before any additional work can be effectively done with that tape drive.

Since mounting, seek, rewind and unmount operations typically take 10s of seconds each, the overall operation may be very inefficient with inherently long latency, especially for use cases in which average or small sized individual objects are accessed randomly across and within tapes. In fact, the tape drives may spend more time on these positioning operations than the actual data read operations.

On the other side, tapes are by far the cheapest storage media and tape storage is the most promising storage option for use cases that can tolerate high data access latency and do not require frequent and random data access. A tape drive is expensive compared to the cost of a single tape, but if a tape drive is used efficiently then it can serve storing and accessing data on many tapes, which makes drive cost being a small part of the overall tape storage cost. Consequently, tape storage is typically used in form of tape libraries. A tape library contains a large number of tapes and a typically configurable but much smaller number of tape drives shared for mounting, writing and reading those tapes.

Tape drives are used efficiently if they spend more time writing and reading data compared to the time spent in mounts, seeks, and unmounts. Each tape drive can deliver a high data throughput when it is efficiently used. For relatively mid and small sized data units, i.e. the data units for which read time by tape drive is comparable or smaller than tape mount time, tape drive efficiency can be achieved only if data units that are accessed together are collocated on tapes. That means that a large number of mid or small sized data units can be efficiently read by mounting a relatively small number of tapes.

Storing data to tape via file system interface is standardized by SNIA via Linear Tape File System (LTFS) Format Specification, for which free open source implementations are also available. To cope with latencies of tape, some solutions use disk as a cache and provide both transparent and explicit operations for moving file data between disk and tape.

Unlike file systems that are designed for working efficiently with data on a sub-file level and are suitable e.g. for high performance computing, the primary design objective of object storage is storing cheaply and accessing efficiently large amounts of data. Object interface is aimed for storing or prefetching entire objects and does not support partial modifications of previously stored objects. Objects are logically organized into containers, and accessed via a RESTful web interface often remotely.

Some object solutions use consistent-hashing based data distribution that allows state-less access nodes to route requests for storing or reading object data to the appropriate storage nodes. That makes such systems robust to access node failures, scalable and extensible. Data is further replicated or erasure coded across the storage nodes for an increased data durability and availability.

In some object solutions the storage namespace is logically organized into accounts that can contain containers, and containers can contain objects. Any accessor node can consistently determine for an object the storage node and the storage location within the storage node, by computing hash of the object URL (Unique Resource Location) identifier and using the hash to storage location mapping defined in so called object rings.

An object ring defines mapping between ranges of possible hash values ("ring partitions") and nodes and storage corresponding to each ring partition. Hash of an object URL determines the ring partition which is then mapped to a node and storage location within the node where the object gets stored. There may be multiple object rings within an object storage system, each identified by so called storage policy. When a container is created it is assigned to one of storage policies and all of its objects are stored to the object ring that corresponds to that storage policy. Nodes and storage used for storing account or container metadata (which includes listing of container objects) are similarly organized in so called account or container ring, respectively.

Accessor nodes do not need to store per object state information. Each accessor node only needs to keep the definitions of the rings, which is a static and small information that does not change when creating or deleting accounts or containers or when storing or deleting objects, which makes the solution efficient, robust and scalable. Changing an object URL by renaming the object in fact implies changing the object storage locations and is an uncommon operation.

When using standard hash-based data placement, bulk storing or reading many objects that belong to the same container, which is a frequent use case, is load-balanced across the accessor nodes that then route the individual object requests to different storage nodes in a randomized manner, thus distributing and serving the workload efficiently. This is especially suitable for online disk storage since each storage unit is always online and accessible for data reads with relatively low latency.

Object storage is also offered as a remotely available service, some of which are based on proprietary solutions that are not published or well known. E.g., for Amazon Glacier it is even not publicly known which storage media and technology is used for storing the data.

As described previously, object storage solutions typically use file system as a backend for storing object data. And file systems are available for storing data on tape. However, the existing object storage solutions are designed for LLM and are not very usable when run on top of a tape file system. While non-delayed writes are possible to already mounted tapes, bulk reads (many read request within short time) are likely to access randomly many tapes which implies high read latency that may cause object storage or application timeouts and also inefficient and therefore cost-ineffective use of tape drives.

For file system storage, the problem of parallel bulk reads was addressed by introducing a disk cache tier in front of tape, that keep file metadata on disk and support policy based or explicit migration of file data to tape as well as transparent or explicit recall of file data to disk.

Regarding object storage tiering, Amazon Glacier supports bulk prefetching data to online storage from an archiving tier, before the data can be accessed, but internals of their solution are not publicly known and it is even not known what storage media is used in the archiving tier.

Collocating data on tapes groups together data that is likely to be accessed together. Examples may provide for the collocation of data on tape in a distributed (scalable) consistent-hashing based (object) storage.

Examples may provide for a solution for storing, managing and accessing data in a distributed object storage system that makes accessing the objects stored on high latency media performance and cost efficient. High latency media can be e.g. tape, optical disk, or disks that are powered off and on for energy saving, and is typically used to store infrequently accessed data that is also often referred as cold data. Some mechanisms of the proposed solution also optimize or avoid data rebalancing when growing the object storage system; i.e., when adding new nodes or storage devices.

The solution works by collocating objects that are likely to be accessed together, e.g. objects from one container, across an appropriate number of storage nodes and storage tapes. One feature examples may have is to collocate the likely to be accessed together objects on one or few nodes and one or few tapes, in order to efficiently use tape drives for reading the data, but also ensure enough nodes and tapes are used when the amount of objects likely to be accessed together is large, in order to limit the time needed to read those objects from tape, e.g. when prefetching them to disk for further random-access processing. This is in contrast to the existing disk based solutions that randomly distribute objects of a container across a fixed and typically large number of nodes, which also often implies large number of tapes.

A potential advantage of examples is that it may enable good utilization of expensive tape drives when used for object storage, making the overall solution cost effective. Cost is one of most important aspects of cold storage. The solution also shortens time to access data, and makes the access time statistically bounded and predictable, which is also relevant for many cold data use cases.

Another advantage may be more efficient data rebalancing. One variant of the solution enables to avoid moving previously stored data when new storage is added to extend system capacity. Moving previously stored data is necessary with standard object storage solutions in order to free capacity on old nodes, but with tape storage this would imply further resource requirement on expensive tape drives to move the data but also raise the requirement to re-claim space on the tapes where the data got moved from which will require additional tape copy operations.

Because the proposed mechanisms add object collocation function while preserving scalability of standard object storage solutions, it enables sharing of tape drive resources by many users. As the individual user tape data access for read is typically sporadic and bursty, large scale sharing of expensive tape drives increases the drives utilization and makes the system cost efficient, which is one of the most important aspects of cold storage offered on the market.

A detailed description of an example using a container of objects as the most representative example of cold data that is likely to be accessed together, but the same solution and description hold for other data likely to be accessed together, e.g. objects that may span multiple containers or only a part of a container and can be related to each other e.g. by use of a "correlated-access id" added to objects or containers metadata.

The solution consists of multiple mechanisms for deciding and performing an appropriate object data placement based on the number and size of objects likely to be accessed together, the retrieval time objective, and the time pattern of storing a container's objects by user or application.

Parameterized consistent-hashing based data placement is one of the data collocation mechanisms which examples may use to place objects of a container across an appropriate number of nodes. The parameters that determine the number of nodes to use and the selection of the nodes are first determined at object write time based on the object timestamp range and the container size at start or end of that time range (as detailed below) as well as on the response time objective such as e.g. expected or maximum retrieval time.

Given that typically two or more data copies are required, each copy might have the same parameters but they might also have a different set of data placement parameters (for example, one aimed at optimized response time objective and another at efficient bulk export).

The parameters for different time ranges may be added to the container metadata that is stored using existing scalable and efficient solutions (e.g., stored distributed across container metadata nodes on low latency media, e.g. in form of container metadata databases). At access for read, the object timestamp metadata and the corresponding time-range related parameters are then available from the container metadata, ensuring consistent determination of object location.

Figure 3:
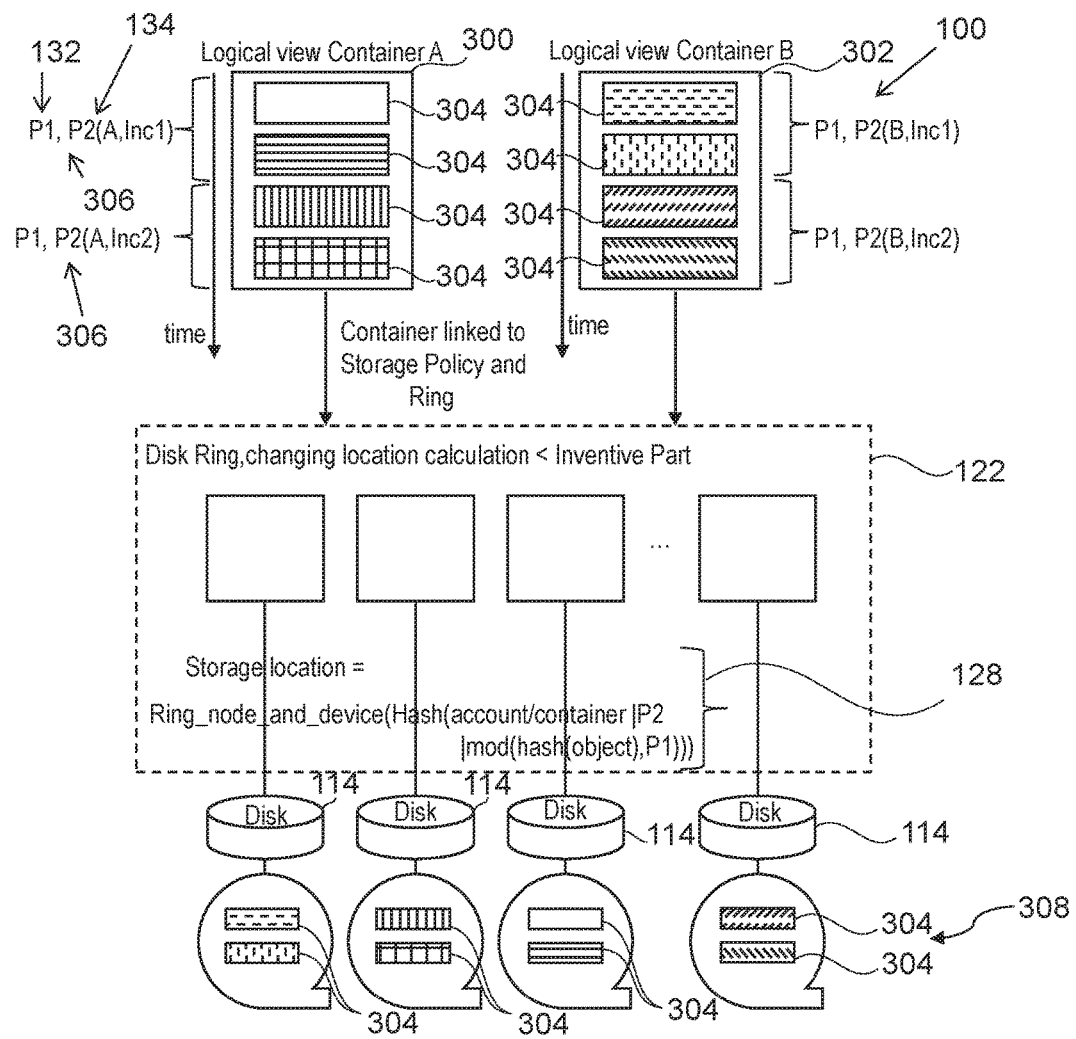
FIG. 3 shows a logical implementation of an object-based data storage system.

Exemplary instantiation of the above described mechanism is as to e.g. modify standard randomized data placement as follows. A standard randomized data placement illustrated on FIG. 3a determines storage location by computing a consistent hash on top of account/container/object path, then using a mapping table between the hash ranges and storage nodes/devices:

FIG. 3 shows a logical implementation of an object-based data storage system 100. The implementation shown in FIG. 3 shows a logical implementation of a logical view of a first container 300 and a logical view of a second container 302. The first container is referred to as container A and the second container 302 is referred to as container B. Each of the containers 300, 302 contains a number of data objects 304. Logically the containers 300, 302 are able to communicate with a number of object storage rings 122. As illustrated in FIG. 2 the surjective function 128 can be used to generate addresses for accessing storage locations on the storage nodes 114. The data objects 304 are shown as being physically stored in various storage nodes 114. The containers 300, 302 are shown as containing metadata 306. The metadata may comprise a first parameterization value 132 and a second parameterization value 134 as was described in FIGS. 1 and 2. The first parameterization value 132 is also referred to as P1 herein. The second parameterization value 134 is also referred to as P2 herein. In some implementations the first parameterization value 132 may control a number of nodes over which specific objects within a specific timestamp or range spread. A small value of P1 can be used for a good co-location of small containers. P2 134 may control a selection of nodes over which objects with a specific timestamp for example are spread. This may enable dynamic replacement at constant container increments. It may also enable to place different parts of large containers to different nodes.

In some examples the storage nodes 114 may use high latency storage 308. They could for example be tapes or tape drives.

In FIG. 3, a parameterized consistent-hashing may be used, let P1 be the parameter that determines the number of nodes of the parameterized consistent-hashing during a "time range" mentioned above, and let P2 be the parameter for switching to (statistically) different set of nodes from one to another time range. Then the storage location could be computed, e.g., as:

Storage location=Node_device_map(Hash(account/
container|P2|mod(hash(object),P1))

where "|" represents a string concatenation operation and mod( ) represents a modulo operation.

P1 would be selected based on number of nodes to use for storing a container data during a container increment period, it could in principle be equal to 1 but a larger value can be used if more write bandwidth is needed. P2 would be incremented for each next time range. If P1=1 then each time range would be a time interval during which the container size increments for the amount of a container data that is suitable for storing on and serving from one node, which would further depend on the expected retrieval time. The container retrieval time from one tape on one node is proportional to the amount of data stored per tape and inversely proportional to effective bandwidth of a tape drive plus tape mount and unmount time, and the total container retrieval time further depends on number of tapes per node storing that container data and number of drives per node that can be used in parallel.

It should be noted that the time-range can be adjusted "on-the-fly," for instance, so that the time-range P2 stops once a certain capacity T is reached, and then a new time-range P2' is started, and once the container reaches a capacity of 2 T, 3 T, etc., then a new time-range P2", P2'", etc., is started. This is especially useful for storing slow-filling containers.

The above described solution does not need storing per object state at accessor nodes, so it keeps the scalability of the standard hash-based data placement solutions. On the other side, an additional step of access to container metadata is introduced in order to access a previously stored object.

However, if the above described solution is used in combination with object indirection the parameterized consistent-hashing mechanism may be applied by utilizing the object symbolic links for storing and accessing the hash function parameters, e.g., as the symbolic link attributes, which in that use case may be more efficient than accessing the container metadata. The storage location of symbolic links can be determined via standard consistent-hashing, and location of data objects via the newly introduced parameterized hashing. This is illustrated in FIG. 4 described below.

Figure 4:
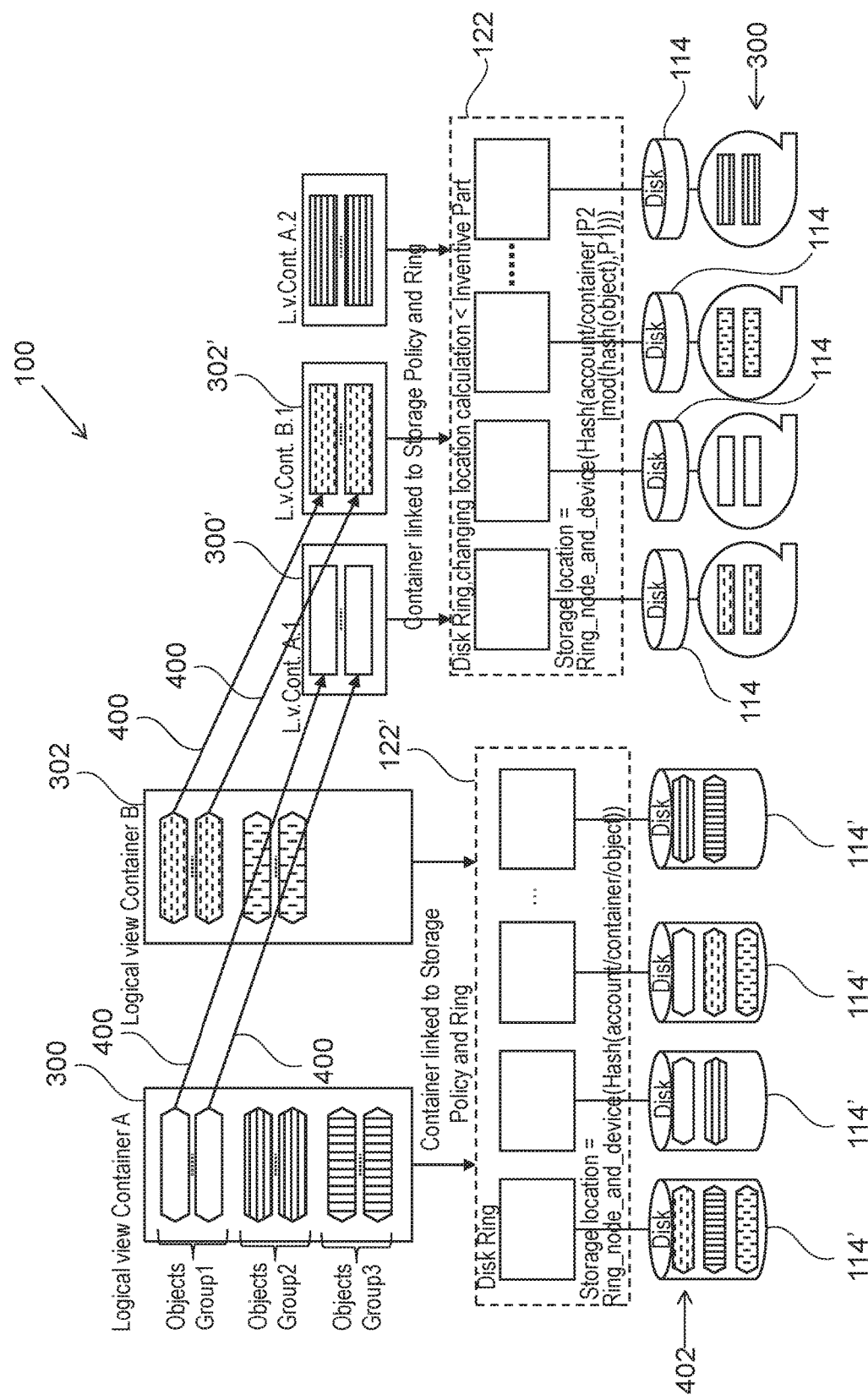
FIG. 4 shows a further logical implementation of an object-based data storage system.

FIG. 4 shows a further example of an object-based data storage system 100. In this example the high latency storage 308 is shown as being combined with a low latency storage 402. The logical containers 300, 302 are shown as being implemented as they are in FIG. 3. However in this case there are logical links 400 which point to additional containers 300' and 302' respectively. The containers 300' and 302' use the ring 122 and storage nodes 114 as was shown in FIG. 3. The data objects 304 are also identically stored using the alternative instance of the storage rings 122'. The storage ring 122' stores initially the data objects 304 in low latency storage 402 such as disc drives. To offload the low latency storage space, the data objects 304 are replaced by links that store only object metadata and no object data and the data objects are stored on the high latency storage 308 which can for example be implemented as tape or tape drives.

In FIG. 4, Parameterized consistent-hashing based object collocation used in combination with symbolic link based ring to ring data tiering. Hashing parameters are stored e.g. as extended attributes of symbolic links, then used to modify hash computation in a way that groups together object of a container with the same parameters.

Whether the hash parameters are stored as part of container metadata or within symbolic links, the same parameters that are adaptively determined and used at store time are also available later at read time, which provides adaptive yet consistent hashing and which is novel. This mechanism is useful for efficiently collocating objects of growing containers.

If object indirection is not used and extra access to container metadata is not desired, the parameterized consistent-hashing may still be applied by using the same consistent-hashing parameters for all the objects of a container, which is useful for some limited use cases that are still of practical interest: use case in which an approximate final container size is known in advance (e.g., for surveillance data), or use case in which entire containers are stored and migrated at once (e.g., archiving entire project or measurement data for potential later processing, by moving it from HPC file storage to archival object storage). Then the per-container consistent-hashing parameters may be cached and accessed efficiently at accessor (proxy) nodes when accessing many objects from the same container.

For some of the existing object storage solutions modifying consistent hashing might require larger code changes and impact multiple dependent functions and therefore might not be easy to push into the upstream code if, e.g., developed and maintained by an open source community. Some examples may therefore provide for an additional mechanism for collocating objects across storage nodes, named "automated assignment of collocation rings," which limits or avoids changes to consistent hashing used in existing object storage solutions, and which is easier to add as a proprietary solution on top of an existing object storage solutions.

Automated assignment of collocation rings is yet another mechanism we propose for collocated data placement across storage nodes. Examples may be built on top of existing implementations of subset of storage nodes and storage resources. This may for example be performed by an association performed using container metadata or "storage policy."

Figure 5:
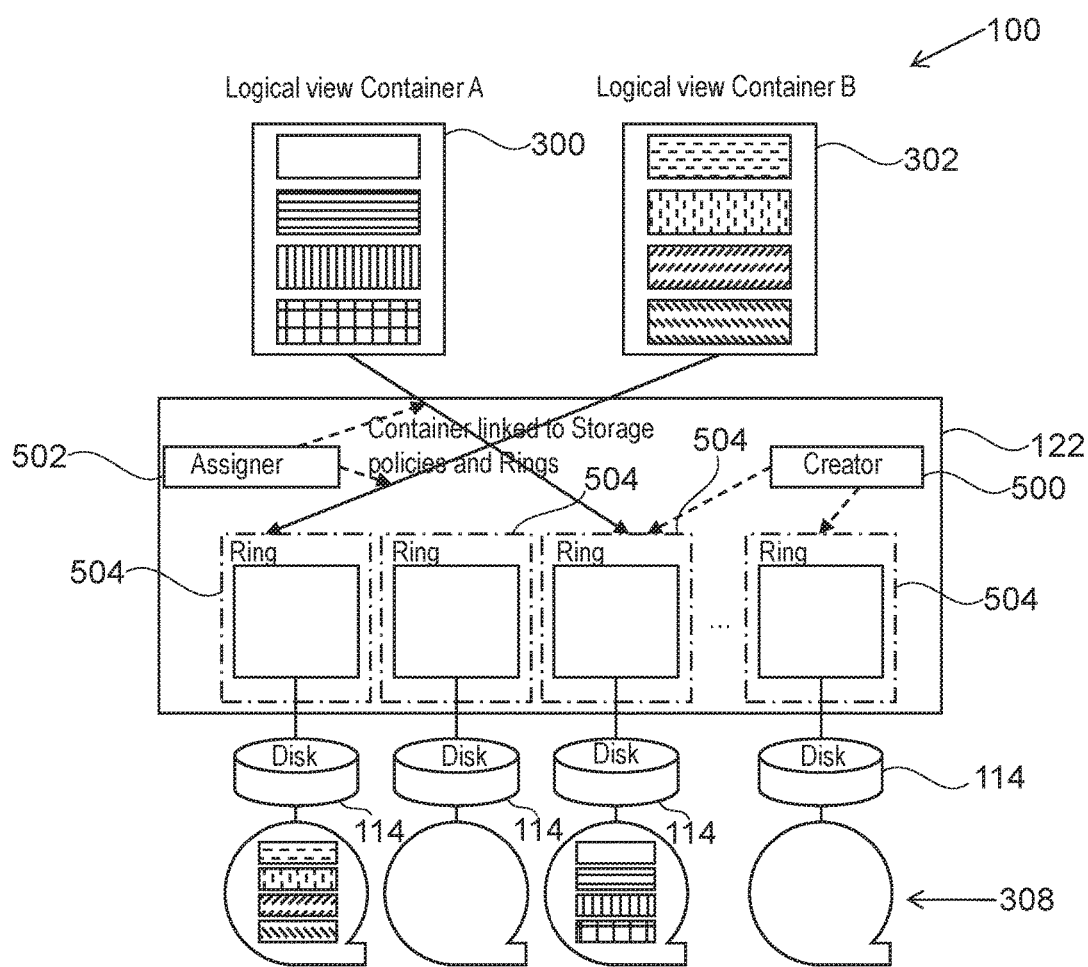
FIG. 5 shows a further logical implementation of an object-based data storage system.

The mechanism is illustrated in FIG. 5 below. It introduces creating and using many object rings, termed "collocation rings" each on a subset of cluster nodes, either manually or automated ("creator" in FIG. 5). The object rings built on top of a small subset of nodes enable good data collocation for containers associated to those rings. However, having many object rings implies a novel and previously unsolved problem related to assigning each container to a storage policy i.e. to one of the collocation rings. Therefore we also propose adding and using a new functional component that can be added to standard object storage solutions, that assigns ("assigner" in FIG. 5) in an automated way each newly created container to a collocation ring i.e. to a storage policy. E.g., the assignment can be based on free storage space of the object rings that might be significantly larger for newly added object rings (nodes).

FIG. 5 shows a further example of an object-based data storage system 100 that is similar to that illustrated in FIG. 3. In this example the object storage rings 122 have additional creator 500 and assignor 502. The creator 500 is used to create multiple object storage rings 504 instead of a single first object storage ring 122, each using one storage node or a subset of the multiple storage nodes. The assignor 502 then explicitly links containers to specific rings 504. This is done in an automated way which is transparent to the user. Many rings are created with a small number of nodes or clusters that are shared using the same tape resources. This illumination may be appropriate for small containers. This may also be appropriate for large containers if they are all stored at once and/or if the size of the containers is known in advance. In this case a data ring of appropriate size with an appropriate number of nodes and clusters can be assigned.

While data collocation is desirable, when doing multiple data copies anti-collocation considerations can come into play. For example, if you have multiple tenants placing a primary copy of their data on a particular subset of storage nodes and storage resources, you can assure that the secondary copies of those other tenants' data is anti-collocated relative to the tenant's secondary copies. Anti-collocation actually improves as the solution is scaled out further. The resulting solution greatly reduces the impact of any one tenant on other tenants.

The automated assignment of containers to collocation rings could also be based on other information such as account, service type (e.g. based on expected data retrieval time), or even random, but existing known mechanisms for default or user based assignment, which are the original and currently supported use of storage policies, are not applicable. This is because users do not and should not have to know or care about how many and which object rings are created within the same type of storage for the purpose of data collocation. In other words, this approach is novel and in contrast to original and currently supported use of storage policies that typically use one data ring per type of storage (such as "replicas on disk," "replicas on SSD," "erasure code on disk," etc.).

One potential advantage of examples is that objects of a container get collocated to a small enough number of nodes so that drives can be used efficiently for accessing the container objects.

Another important potential advantage is that if object storage is running out of free capacity new nodes and storage can be added as new object rings and moving previously stored data for rebalancing purposes can be avoided, which is especially useful for tape storage in order to avoid additional use of expensive tape drives resources for rebalancing as well as tape reclamation that would typically be amplified by data rebalancing.

While this mechanism is suitable for storing well limited containers that can be served by the small collocation rings, there are other issues for the use cases in which containers may grow over time so to become too large for its initial object ring. This potential limitation can be avoided if the mechanism is used, e.g., in combination with symbolic-links based tiering. That means a container is created in a standard way using the default or a user assigned storage policy not based on tape storage, but its objects data can be tiered to a tiering-target container created in one of the object collocation rings equipped with tape and managed by the proposed mechanism. When the original container grows too large for one collocation ring, another tiering-target container can be created in a different collocation ring and used for tiering of newly stored objects, and so on. This is illustrated in FIG. 6 described below.

Figure 6:
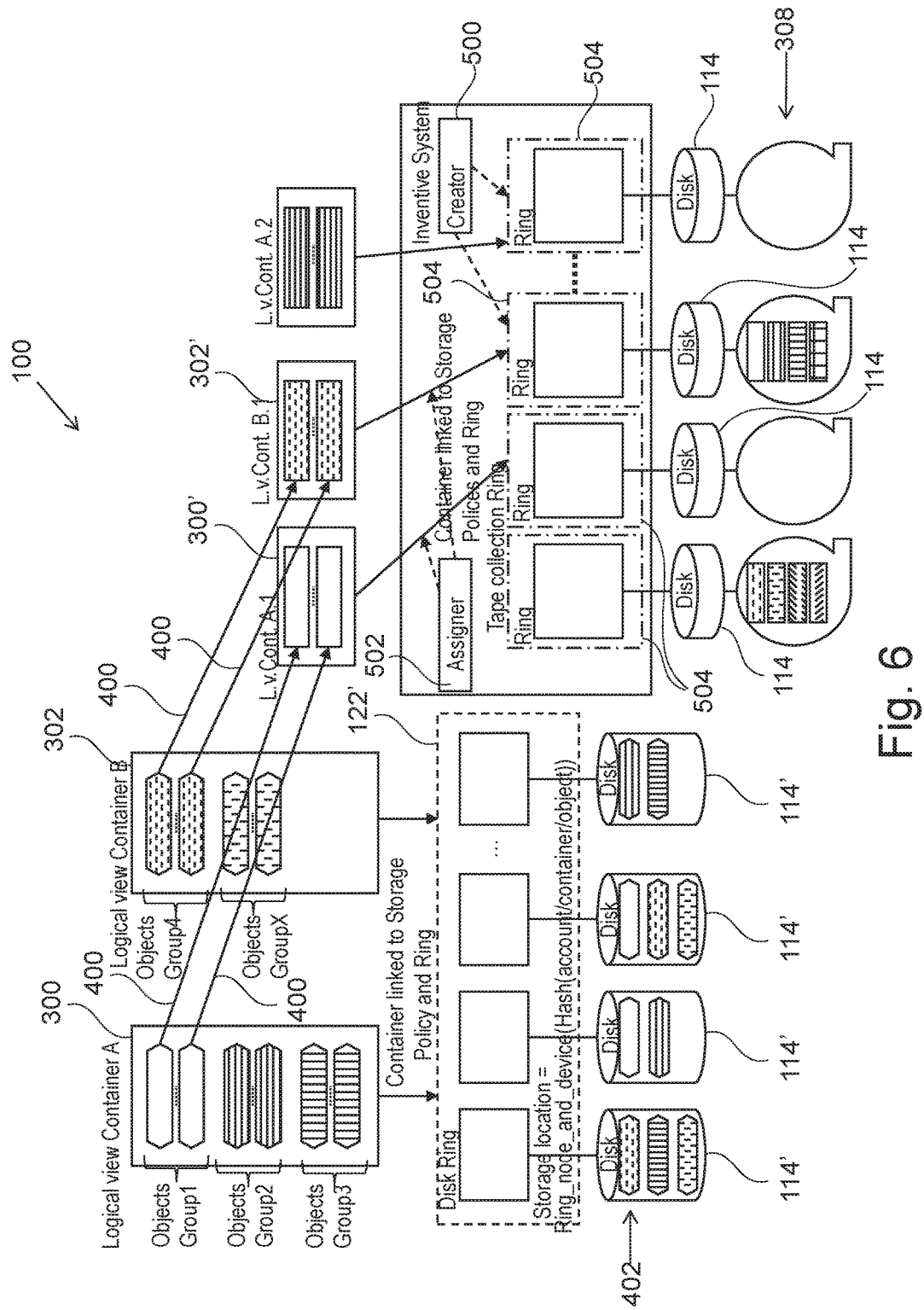
FIG. 6 shows a further logical implementation of an object-based data storage system.

FIG. 6 shows a further example of an object-based data storage system 100 that combines the future of the object-based data storage systems illustrated in FIGS. 4 and 5. In this example the symbolic links 400 are used for ring-to-ring object curing. Within parts of a large or potentially slowly filling container may be assigned to different co-location rings 504. This may provide for a better load balancing and/or use of resources.

FIG. 6 shows the of tape collocation rings in combination with symlink based data tiering for collocation and anti-collocation of objects on tape. Tape object storage is organized into many small object rings called tape collocation rings, e.g. one or few local file system nodes, or a small file system cluster. A group of objects from a container that can be served efficiently and within service level constraints by one tape collocation ring is collocated by tiering it to one tape collocation ring, the next such group of objects from the same container is anti-collocated by tiering it to another tape collocation ring, etc. That ensures good utilization of tape drives and satisfying service level agreement constraints for dynamically growing containers. Within a tape equipped backend objects are cached on disk and can be migrated to tape. Creating tape collocation rings and target containers, object groups, and assignment of object groups to collocation rings can be automated and transparent to users. Tiering and migration operations can be explicit or transparent to users.

It should be noted that this mechanism is especially suitable for building object storage on top of a file system storage backend based on a clustered file system with disk cache and migration to tape. In this case multiple but in practice limited number of nodes of a file system cluster can share a number of tape drives and tapes, and the system can be scaled by using multiple file system clusters. Here it should be again emphasized that for better utilization of expensive drive resources scaling a single system shared by many users is better than using multiple smaller systems. Multiple smaller systems, however, have the advantage of better isolating impact of tenants from each other and also in giving more options for placement of data at different physical locations. This proposed mechanism accounts for this and is effective on both large and small systems.

All the nodes of one cluster can be used in parallel for initially storing data on disk cache, and any of the nodes can migrate or recall data to one tape (for small containers) or multiple tapes (for bigger containers).

Previously described mechanisms collocate a container's data to a limited number of nodes, in some variants depending on the container size. It is further necessary to ensure within each node, or a cluster of nodes that can access same tape resources, that a container data stored to that node or cluster be stored on appropriate number of tapes.

The appropriate number of tapes to use for storing a container data per node (or per cluster of nodes that can access same tapes), as well as the amount of container data to store within each tape depends on the retrieval latency and drive efficiency to be achieved. Drives are used most efficiently if all data of a container is stored on one node and one tape if possible, and only when a tape is full the next tape should be used (preferably on a different node in order to have a shorter container retrieval time), and so on.

If the container retrieval time has to be smaller than the time to read one entire tape, amount of data stored per tape has to be limited. Also, the number of drives has to be dimensioned appropriately so that the average queuing time of the retrieval requests does not be large.

The time to retrieve the objects of a container from one tape on one node is influenced by the tape mount and unmount time, seek time, and data read time. The data read time is proportional to the amount of data stored per tape and is inversely proportional to the effective bandwidth of a tape drive. The total container retrieval time further depends on the number of tapes per node storing the container data and the number of drives per node that can be used in parallel. Therefore, when the number of drives per node (or a cluster of nodes able to access the same drives and tapes) is known, to achieve best retrieval times the number of tapes per container on a node should be smaller or equal to number of drives if possible, and the maximum amount of a container data per tape can be computed based on the desired retrieval time and the effective bandwidth of one tape drive.

Because these solutions are often multi-tenant, the number of drives needs to also account for competing tenant requests. This is likely not a fixed formula but rather based on information such as historical data about when a tenant uses the service and with what quantities of data. It is also contemplated that for large requests the customer could send ahead information about when planned data transfers are coming to allow for better drive allocation planning. Another factor is how many copies of data have been requested. In the presence of multiple copies, some data can be retrieved from secondary copies to improve retrieval times. It is also contemplated in a large tape library that drives could be dynamically moved between nodes or node clusters.

Another practical aspect of collocating container objects on tapes within a node is related to the dynamics of adding objects to a container, especially when the dynamic of the container growth and its final size are not known. Cost effective use of tapes assumes high tape capacity utilization, but filling tapes as objects get stored may result in spread of a container across a large number of tapes within one node, which would imply inefficient use of tape drives and larger restore times due to many mounts/unmounts required for retrieving the container data. E.g., this can happen if migration policy is "if object data has been on disk longer than Time-t, migrate to tape."

One way to handle this problem is caching data on disk (at a higher price) and allowing migration to tape only for large enough containers (a simple usage constraint) or for large enough (initial or subsequent) container increments (somewhat less restrictive but also less simple usage constraint). The threshold to migrate larger containers to tape might also be influenced by how full the cache is.

When a particular container has been migrated to tape so that the container is what is at End Of Tape, there is a particularly strong affinity for that tape to that container for the next migration—and the affinity is even stronger if the tape is still mounted and located at End Of Tape. This affinity can further improve data collocation. There is also an affinity—though weaker—for containers that are already written to that tape.

Not all containers will be transferred quickly. In the case of slow filling containers it is expected that the data will eventually have to be transferred to the lower cost tape tier. It is possible to buffer newly added objects on disk (if there are many slowly filling containers disk buffering has to be limited) or on buffering-dedicated tapes (which takes the overflow from disk buffering, which is likely in case of many slowly filling containers) and do the final tape data placement once the container increments are large enough.

Buffering-dedicated tapes are aimed for temporarily storing small container-increments when they overflow from disk buffer, as they are more likely to be soon regrouped into larger container-increments. The larger container-increments, regrouped from tapes or accumulated on disk cache, are stored to another set of tapes (archiving-tapes) and are less likely to need to be regrouped again. Regrouping prioritization can take into consideration which tapes have the most opportunity to regroup containers into bigger segments. It can also account for how much data on each tape has been marked for deletion.

If the number of tapes holding container objects goes above a threshold for timely retrieval, objects of that container should be regrouped. This might cause content on some tapes to be invalidated resulting in unusable tape capacity because tape is typically used as append only media. Reclaiming the unusable tape capacity requires copying its valid data to another tape and then reformatting the tape, which should be done when the amount of the invalidated content (i.e., percentage of the tape capacity that can be regained) goes above a certain threshold.

In algorithmic terms, automated migration of slow filling containers (whether all stored objects are considered cold i.e. migration candidates, or only objects explicitly marked as such) could be done e.g. by running in parallel the following two pseudo-algorithms (other algorithmic variations applying the above described generic guidelines are possible):

```
A1:
while (true):
    determine the container with the largest increment V of cold objects
    cached on disk
    /* Increment size is refactored to account for above mentioned con-
    tainer affinities and for how far above a threshold disk cache usage
    is */
    if (disk cache usage > threshold Tu1) or (V > threshold Tvmax)
    /* Note - Tvmax1 might be set to the capacity of a tape. */
        if V > threshold Tvmin
            queue (Q1) for migration to archiving-dedicated tapes
        else if (disk cache usage > threshold Tu1)
            queue (Q2) for migration to buffering-dedicated tapes
            /* Note: the number of not full buffering tapes should be equal
            to number of drives */
    if there are drives free for migration:
    /* Recalls have priority unless the disk cache usage is too high i.e.
    above threshold Tu2) */
        schedule migrations from Q1, if none then from Q2
A2:
while (true):
    if a container spans more than Tt tapes:
        queue those tapes (Q3) for regrouping the container by recall/mi-
        grate
    if there are tapes with invalidated content above threshold Ti :
        queue those tapes (Q4) for reclaim
    if there are drives free for regrouping and reclaim:
    /* serving Q3 or Q4 has lower priority than serving Q1 or Q2 */
        schedule operations from Q3, if none then from Q4
```

Suitable thresholds values could be determined e.g. by modeling the implied drive usage and system cost and performance and optimized using a standard optimization framework.

The above examples of collocation can be enhanced by taking user defined container and object metadata into account (the previously mentioned "correlated-access id" added to objects or containers metadata). A user can add user metadata to containers and objects which is used to decide on container collocation on tape. He could group containers and objects and mark this group as having a very high chance to be accessed again together. Means if one object is recalled, the chance that the other object belonging to the same metadata group will be recalled too, is very high.

Additionally some workloads allow a user to foresee when certain objects will arrive in the container and what size they will have. He could add such details as metadata. Size and timing forecast details help with collocation planning and the execution. This is illustrated in FIG. 7 described below.

Figure 7:
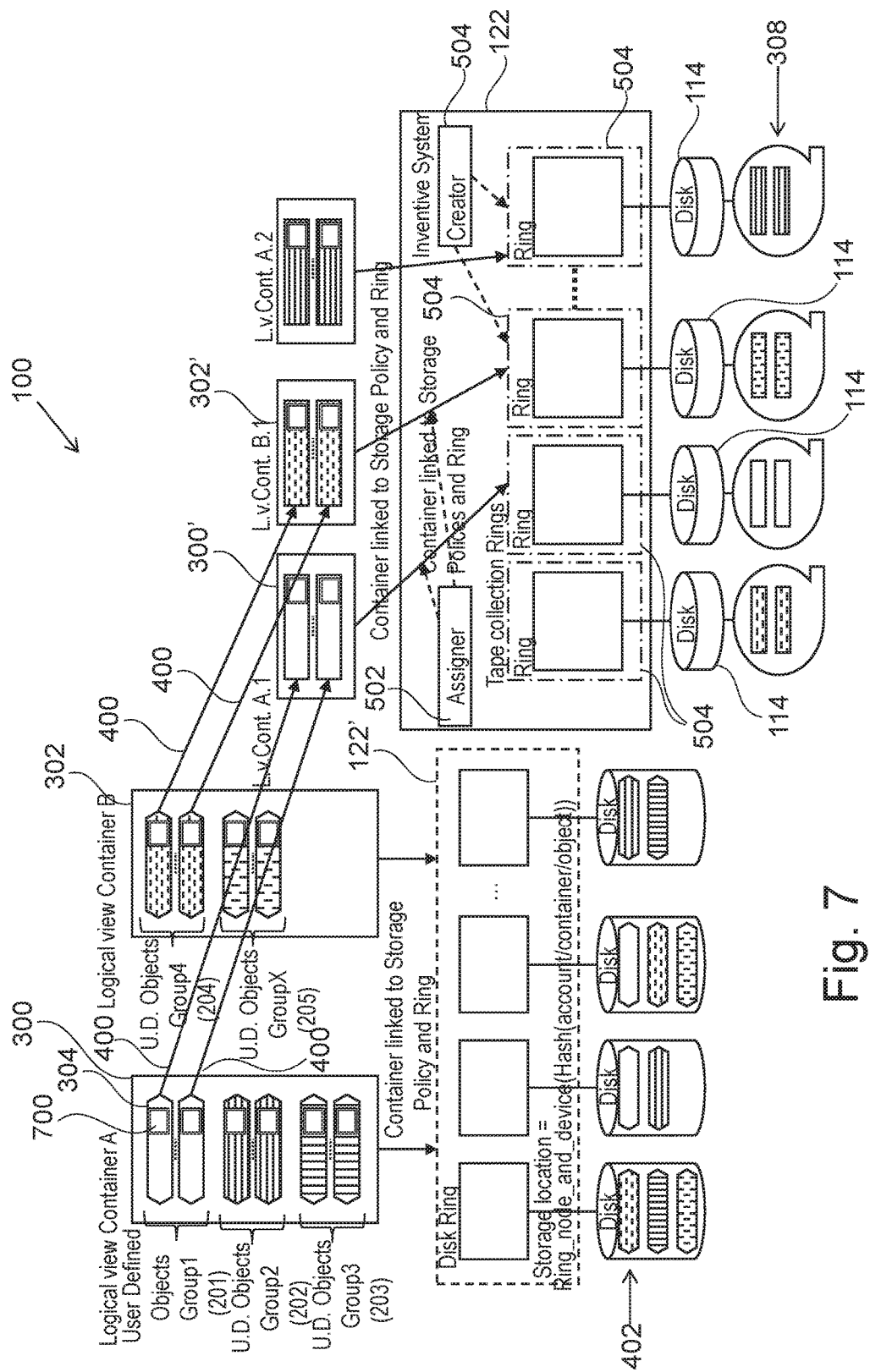
FIG. 7 shows a further logical implementation of an object-based data storage system.

FIG. 7 shows a further modification of the object-based data storage system 100 shown in FIG. 6. In this example the data objects 304 contain additional metadata 700. The metadata 700 may for example be written to the objects by a user or operator. This additional metadata 700 is then combined with the global identifier, first parameterization value, and a second parameterization value for generating the storage addresses 136 by the co-location rings 504. This may allow co-location objects that are likely to be accessed together even if they belong to different containers or only part of a container.

Groups could also be subgroups of a parent group. Certain metadata entries can be combined to decide on collocation on tape with logical operations (&,|,!&,!| . . . ).

The above examples can be used separately or in combination, depending on suitability of implementation and integration with a particular object storage solution, e.g. integration with an existing object storage software and system.

Notice that theoretically it is possible that all the nodes of one object storage region be connected via a storage network to all drives and can access all tapes of the underlying tape storage. In that cases a standard randomized object placement across nodes could be used and theoretically still each node could store objects of a container to the same tape (or a limited number of tapes dependent on the size of the container). However, coordinating the nodes for such use of drives and tapes is a complex problem from both algorithmic and implementation aspect, and the solutions according to one or more embodiments of the invention described herein are more practical and feasible.

The proposed data collocation examples can be applied orthogonal to typical mechanisms used for storing multiple object replicas, which is expected to be typical for cold tape-based object storage.

Some object storage implementations may also allow for managing tiering or migration of objects per replica, e.g. migrating 2 out of 3 replicas to tape and keeping one replica on disk, in which case the above described mechanisms may be applied only to tape replicas. Treating different replicas differently can be achieved e.g. either by use of additional object metadata (stating which replicas to tier and/or migrate) or using per "zone" settings for automated tiering/migration, if object storage resources are divided into zones and each zone stores normally (if all zones are available) only one object replica.

For many practical use cases it might be suitable to use the above examples with low latency media storage used as a buffer for newly ingested objects, and have migration to tape automated and delayed so that related objects, e.g. objects added to the same container, are migrated in bulks in order to achieve improved data collocation on high latency media. In case of the buffer overflow, e.g. when many independent containers are filled slowly, the new objects from a number of containers may be stored to one or more temporary tape pools in order to free the buffer space needed for normal operation. When the buffer usage is back to normal, the objects from the same temporary tape pools may be recalled all together into resident state (the tape copies are invalidated), e.g. during off-peak hours, so that tape mounts and seeks are optimized and the pool tapes can be efficiently reclaimed (e.g. a simple reformatting is sufficient). A temporary pool that has objects from containers that have more new data added may be selected, because statistically that allows to empty more low latency buffer space and collocate larger bulks of data by subsequent migrations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An object-based data storage system for storing data objects across multiple storage nodes comprising:
    a memory for storing machine executable instructions, wherein the machine executable instructions are configured for implementing logical containers for the data objects each having a global identifier, wherein the containers are configured for storing metadata, wherein the metadata comprises a first parameterization value descriptive of a number of storage nodes selected from the multiple storage nodes for storing the data objects, wherein the metadata comprises a second parameterization value descriptive of a classification of the data objects, wherein the machine executable instructions are further configured for implementing at least a first object storage ring for addressing storage locations across the multiple storage nodes using a surjective function; and
    a processor for executing the machine executable instructions, wherein execution of the machine executable instructions causes the processor:
        to instantiate the at least first object storage ring,
        to receive the global identifier and the metadata by the at least first object storage ring for a data object selected from the data objects, and
        to generate a storage address by the at least first object storage ring for the data object using the global identifier, the first parameterization value, and the second parameterization value as input to the surjective function.

2. The object-based data storage system of claim 1, wherein the surjective function is a hash function.

3. The object-based data storage system of claim 1, wherein the object data storage system further comprises the multiple storage nodes, wherein at least a portion of the multiple storage nodes are configured for accessing high latency storage devices.

4. The object-based data storage system of claim 1, wherein the second parameterization value is an identifier of a container of the object-based data storage system.

5. The object-based data storage system of claim 4, wherein the container is configured for storing objects to a selected storage ring selected from one of the at least a first object storage ring.

6. The object-based data storage system of claim 1, wherein execution of the machine executable instructions causes the processor:
    to receive a command to add an additional storage node to the multiple storage nodes;
    to instantiate a new object storage ring in response to the command to add an additional storage node; and
    to store a selection of the new object storage ring in the metadata of a newly added container so that data objects of the newly added container are stored to the new object storage ring.

7. The object-based data storage system of claim 1, wherein the at least first object storage ring is further configured to retrieve a data object from the multiple storage nodes using the storage address.

8. The object-based data storage system of claim 1, wherein the at least first object storage ring is further configured to store a data object from the multiple storage nodes using the storage address.

9. The object-based data storage system of claim 1, wherein the global identifier comprises an account identifier, a container identifier, and an object identifier.

10. The object-based data storage system of claim 9, wherein the storage address is calculated from a concatenation of the account identifier, the container identifier, the second parameterization value, and the modulus of a hash of the object identifier and the first parameterization value.

11. The object-based data storage system of claim 9, wherein the object-based data storage system is configured for generating the second parameterization value by applying a mapping to the container identifier and an incremental value.

12. The object-based data storage system of claim 11, wherein the object-based data storage system is configured for generating the incremental value using a time value.

13. The object-based data storage system of claim 1, wherein the object-based data storage system is configured for generating the first parameterization value using a value less than or equal to a number of the multiple storage nodes.

14. The object-based data storage system of claim 1, wherein the object-based data storage system further comprises a low-latency object storage ring, wherein the low-latency storage ring comprises a first logical arrangement for multiple storage containers containing objects, wherein the at least first object storage ring comprises a second logical arrangement for the multiple storage containers containing the objects, wherein the object-based data storage system comprises a mapping between the first logical arrangement and the second logical arrangement to store the data objects into the low-latency object storage ring.

15. The object-based data storage system of claim 1, wherein the object-based data storage system comprises a storage buffer, wherein execution of the machine executable instructions causes the processor to add one or more new data objects to the object-based data storage system by:
   instantiating containers for the one or more new data objects;
   storing the one or more new data objects in the storage buffer; and
   copying the one or more new data object in the storage buffer stored within a predetermined time interval to one of the at least a first object storage ring, wherein the each of the one or more new data object is assigned an identical second parameterization value.

16. The object-based data storage system of claim 15, wherein execution of the machine executable instructions cause the processor to temporarily move at least a portion of the storage buffer to the multiple storage nodes if the storage buffer contains more than a predetermined amount of data.

17. The object-based data storage system of claim 15, wherein execution of the machine executable instructions causes the processor to:
   copy all data objects with a chosen second parameterization value to the storage buffer, wherein data objects with the chosen second parameterization value are erased from the multiple storage nodes as they are copied; and
   move the data objects with a chosen second parameterization value in the storage buffer to one of the at least a first object storage ring.

18. The object-based data storage system of claim 1, wherein the at least first object storage ring is configured for generating multiple storage addresses with multiple surjective functions to redundantly store the data objects, wherein each of the multiple storage addresses is generated with the multiple surjective functions using the combination of the global identifier, the first parameterization value, and the second parameterization value.

19. The object-based data storage system of claim 1, wherein the object-based data storage comprises storage objects, wherein the object-based data storage system is configured for storing the metadata in the storage objects.

20. A method of storing data objects across multiple storage nodes using an object-based data storage system, wherein the object-based data storage system is configured for implementing logical containers for the data objects each having a global identifier, wherein the containers are configured for storing metadata, wherein the metadata comprises a first parameterization value descriptive of a number of storage nodes selected from the multiple storage nodes for storing the data objects, wherein the metadata comprises a second parameterization value descriptive of a classification of the data objects, wherein the machine executable instructions are further configured for implementing at least a first object storage ring for addressing storage locations across multiple storage nodes using a surjective function, wherein the method comprises:
   instantiating the at least first object storage ring;
   receiving the global identifier and the metadata by the at least first object storage ring for a data object selected from the data objects; and
   generating a storage address by the at least first object storage ring for the data object using the global identifier, the first parameterization value, and the second parameterization value as input to the surjective function.

* * * * *